(12) United States Patent
Litvin

(10) Patent No.: US 7,418,205 B2
(45) Date of Patent: Aug. 26, 2008

(54) METHOD AND APPARATUS FOR CONTROLLING A FREQUENCY HOPPING LASER

(75) Inventor: Kerry I. Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 794 days.

(21) Appl. No.: 10/397,808

(22) Filed: Mar. 25, 2003

(65) Prior Publication Data

US 2004/0190595 A1    Sep. 30, 2004

(51) Int. Cl.
 *H04J 4/00*   (2006.01)
 *H04J 14/00*  (2006.01)
 *H01S 3/098*  (2006.01)
 *H01S 3/10*   (2006.01)
 *G02F 1/23*   (2006.01)

(52) U.S. Cl. ............... 398/77; 398/78; 398/89; 398/197; 372/19; 372/28; 372/32; 359/278

(58) Field of Classification Search ............ 398/77, 398/78, 89, 79; 372/28, 32, 19, 20; 359/278
See application file for complete search history.

(56) References Cited

U.S. PATENT DOCUMENTS

| | | | |
|---|---|---|---|
| 4,959,826 A * | 9/1990 | Smith | 398/90 |
| 6,597,830 B1 * | 7/2003 | Nakabayashi et al. | 385/24 |
| 6,633,371 B1 * | 10/2003 | Lu et al. | 356/72 |
| 2003/0091097 A1 * | 5/2003 | Yap et al. | 375/132 |
| 2004/0018018 A1 * | 1/2004 | Izadpanah | 398/77 |
| 2005/0018724 A1 * | 1/2005 | Da Silva et al. | 372/32 |

OTHER PUBLICATIONS

"Multifrequency erbium-doped fiber ring lasers anchored on the ITU frequency grid"; Bellemare, et al.; Optical Fiber Communication Conference, 1999, and the International Conference on Integrated Optics and Optical Fiber Communication. OFC/IOOC '99. Technical Digest vol. 1, Feb. 21-26, 1999, pp. 16-18.*

* cited by examiner

Primary Examiner—Jason Chan
Assistant Examiner—Nathan M Curs
(74) Attorney, Agent, or Firm—Larry T. Cullen

(57) ABSTRACT

An optical spread spectrum communication system includes a tunable laser which sequentially outputs optical signals having different wavelengths. The laser produces a frequency spectrum having a plurality of closely spaced modes relative to optical frequencies. The system further includes an optical modulator and a frequency synthesizer. The frequency synthesizer controls the optical modulator to allow specific modes from the frequency spectrum to pass through. Additionally, the system includes a tunable filter and a phase locked loop (PLL) control circuit. The PLL control circuit controls the filter to select specific channels. The selection of the specific modes by the modulator and the selection of channels by the tunable filter are performed independent of each other and are based on randomly assigned codes generated in accordance with one or more algorithms.

7 Claims, 7 Drawing Sheets

METHOD AND APPARATUS FOR CONTROLLING A FREQUENCY HOPPING LASER

BACKGROUND OF THE INVENTION

1. Field of the Invention

The present invention generally relates to optical spread spectrum communication systems using frequency hopping techniques.

2. Background Information

In modern fiber optic communication systems, available bandwidth is not a pressing issue because thousands of GHz of spectrum are potentially exploitable in the optical domain. However, utilizing this vast spectrum in an optimal manner that provides both maximum capacity and maximum economic benefit is difficult to achieve. Furthermore, it is particularly expensive to transform an existing network infrastructure so that it can easily accommodate any anticipated future increases in data flow over the vast spectrum.

Wavelength division multiplexing (WDM) has emerged as the primary method by which to exploit the vast optical spectrum available in a fiber optic network. WDM is a classical method for providing multiple access by dividing the optical spectrum into fixed standardized channels centered on specific wavelengths. As additional network capacity is required, more channels must be added which increases the number and complexity of the components in the network.

To further enhance the capacity of the WDM channels, a time-division multiple access (TDMA) scheme has been employed. TDMA allows multiple users to share the same channel by assigning users with a time slot within a larger time frame. When all of the time slots for a particular channel are assigned, the absolute maximum capacity has been reached and there is no means to support additional users on that channel.

Thus, WDM and WDM/TDMA hybrid systems have a hard limit on data handling capacity which, when exceeded, corrupts the systems and disrupts the communications of all users on an overloaded channel.

In this application, an erbium doped fiber ring laser (ED-FRL) is a multimode optical source used as a specific illustrative example of a tunable laser that is modified in accordance with the present invention. Alternatively, a tunable laser such as a semiconductor optical amplifier ring laser (SOARL), an external fiber cavity semiconductor laser (EFCSL) or the like may be used.

In the ring configuration of a conventional EDFRL, the allowed longitudinal modes of the laser satisfy the boundary condition:

$$\cos\left(\frac{2\cdot\pi\cdot f\cdot n}{c}\cdot x\right) = \cos\left(\frac{2\cdot\pi\cdot f\cdot n}{c}\cdot(x+N\cdot L)\right) \quad (1)$$

where f is the optical frequency, n is the index of refraction in the fiber, c is the speed of light in vacuum, x is the positional coordinate along the circumference of the ring relative to a coordinate system, L is the effective circumference of the ring which includes the actual physical length of the fiber ring plus any additional effective lengths due to the various components inserted into the ring which cause additional delays, and N is an integer (N=0, 1, 2, 3 . . . ). Equation (1) is equivalent to writing:

$$\left(\frac{2\cdot\pi\cdot f\cdot n}{c}\right)\cdot(N\cdot L) = 2\cdot M\cdot\pi \quad (2)$$

where M is also an integer (M=0, 1, 2, 3 . . . ).

Letting $f\cdot N = f_m$ where $f_m$ are the mode frequencies, then Equation (2) immediately reveals the allowed mode frequencies of the fiber laser based solely upon its physical layout:

$$f_m = M\cdot\frac{c}{n}\cdot\frac{1}{L} \quad (3)$$

and the mode spacing is therefore given by:

$$\frac{\partial f_m}{\partial M} = \frac{c}{n}\cdot\frac{1}{L} = f_1 \quad (4)$$

The modes are equally spaced and are all harmonics of the fundamental frequency $f_1$.

A solution based solely upon geometrical considerations allows an infinite number of longitudinal modes. The gain spectrum of the erbium fiber places finite limits on the lower and upper frequencies that can exist in the ring laser. Erbium fiber (amplifiers) can typically supply enough gain to overcome the losses in the ring within a band of wavelengths ranging from about 1520 nm through 1580 nm with the optimal band being between 1530 nm through 1560 nm. The wavelength band from 1520 nm to 1580 nm corresponds to a frequency band of 7.495 THz while the reduced band from 1530 nm through 1560 nm corresponds to a frequency range of 3.771 THz. The total number of modes that exist is given by the ratio of the amplifier bandwidth divided by $f_1$, or more generally:

$$M_{max} = \left(\frac{c}{\lambda_{MIN}} - \frac{c}{\lambda_{MAX}}\right)\cdot\frac{n\cdot L}{c} = \left(\frac{1}{\lambda_{MIN}} - \frac{1}{\lambda_{MAX}}\right)\cdot L\cdot n. \quad (5)$$

Accounting for the M=0 term, the total number of modes which can exist is $1+M_{max}$.

For a typical EDFRL with an effective circumference L of about 25 meters, the total number of modes is quite large as the mode spacing is only about 8.17 MHz (n=1.47 in fiber). $M_{max}$=918,000 for the full erbium band and 462,000 for the reduced more optimal band. If a band restricting optical filter is inserted into the EDFRL, then the number of allowed modes is given by the reduced EDFRL bandwidth divided by $f_1$. For a 3 GHz band pass filter in an EDFRL with an effective circumference L of about 25 meters, the number of allowed modes which can exist is thus reduced to no more than 367 with the actual number being much smaller due to the roll-off characteristics of the filter attenuating the modes that are found closest to its skirts.

When a multimode optical signal is detected by a photoreceiver with an appropriate bandwidth, the optical modes "beat" with one another producing a radio frequency (RF) comb spectrum with lines spaced $f_1$ apart from one another starting at zero frequency and moving up in steps of $f_1$. Either the bandwidth of the EDFRL or the photoreceiver determines the maximum observable (usable) beat frequency.

FIG. 1 shows a conventional unfiltered EDFRL configuration 100 including an erbium doped fiber amplifier (EDFA) 105, an optical isolator 110 and an optical directional coupler 115A (e.g., a fusion spliced fiber tap coupler). An optical spectrum analyzer (OSA) 120 is in communication with the coupled port of the optical directional coupler 115A via the direct port of a second optical directional coupler 115B. The OSA 120 is used to view the multimode amplified spontaneous emission (ASE) spectrum generated by the EDFRL configuration 100. A radio frequency spectrum analyzer (RF-SA) 125 is in communication with the coupled port of second optical directional coupler 115B via a photoreceiver 130. The RF-SA 125 is used to view the resulting RF comb spectrum, due to the modes beating in the photoreceiver 130.

FIG. 2 shows a conventional filtered EDFRL configuration similar to FIG. 1 with the addition of a tunable filter 205. The OSA 120 is used to view the multimode ASE spectrum and a laser line at the passband wavelength of tunable filter 205. The RF-SA 125 is used to view the resulting band limited RF comb spectrum, due to the modes beating in the photoreceiver 130.

SUMMARY OF THE INVENTION

The present invention uses an optical spread spectrum approach for adding system capacity that circumvents the brute force approach of simply increasing the number of optical channels on a network. The present invention randomly and dynamically assigns frequency hopping codes (i.e., spreading codes, chip codes) to hop a laser device onto specific wavelengths. Such an approach enables simultaneous multi-user communications within the existing spectral bandwidth of an optical channel while bypassing the need for global modifications throughout the system. Thus, the added costs for future upgrades are eliminated. Furthermore, because the frequency hopping codes can be assigned as desired, and are not fixed, the security of communications using this approach is enhanced.

The present invention is implemented in an optical spread spectrum communication system including a tunable laser which produces a frequency spectrum having a plurality of closely spaced modes relative to optical frequencies. The laser is controlled to sequentially output optical signals having different wavelengths. In a first method step, specific modes are selected from the frequency spectrum. In a second method step, specific channels are selected over which the specific modes are to be outputted as the optical signals. The selection of specific channels is performed independent of the selection of specific modes. One or both of the first and second selection steps are repeated during operation of the system.

The wavelengths of the optical signals may be based on a plurality of randomly assigned codes generated in accordance with one or more algorithms. The specific channels may be selected from a channel grid (e.g., International Telecommunications Union (ITU)).

In another embodiment of the present invention, an optical spread spectrum communication system includes a tunable laser, an optical modulator and a frequency synthesizer. The optical modulator is in communication with the laser. The frequency synthesizer is in communication with the optical modulator. The frequency synthesizer controls the optical modulator to allow specific modes from the frequency spectrum to pass through based on randomly assigned codes generated in accordance with one or more algorithms.

The tunable laser may be an erbium doped fiber ring laser (EDFRL), a semiconductor optical amplifier ring laser (SOARL), or an external fiber cavity semiconductor laser (EFCSL). The optical modulator may be an optical Mach-Zehnder modulator.

In another embodiment of the present invention, an optical spread spectrum communication system includes a tunable laser, a tunable filter and a phase locked loop (PLL) control circuit. The tunable filter is in communication with the laser. The PLL control circuit is in communication with the laser. The PLL control circuit controls the filter to select specific channels based on randomly assigned codes generated in accordance with one or more algorithms. The tunable filter may be a fiber Fabry-Perot piezo-electric tunable filter.

In another embodiment of the present invention, an optical spread spectrum communication system includes a tunable laser, an optical modulator and a tunable filter. The optical modulator is in communication with the laser. The optical modulator selects specific modes from the frequency spectrum. The tunable filter in communication with the optical modulator. The filter receives the specific modes and selects specific channels over which the specific modes are to be outputted as the optical signals. The selection of the specific modes by the modulator is performed independent of the selection of channels by the tunable filter. The optical spread spectrum communication system may also include at least one processor and at least one algorithm running on the processor. The algorithm randomly assigns codes used to control the selection of the specific modes and the specific channels.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DETAILED DESCRIPTION OF THE INVENTION

Figure 1:
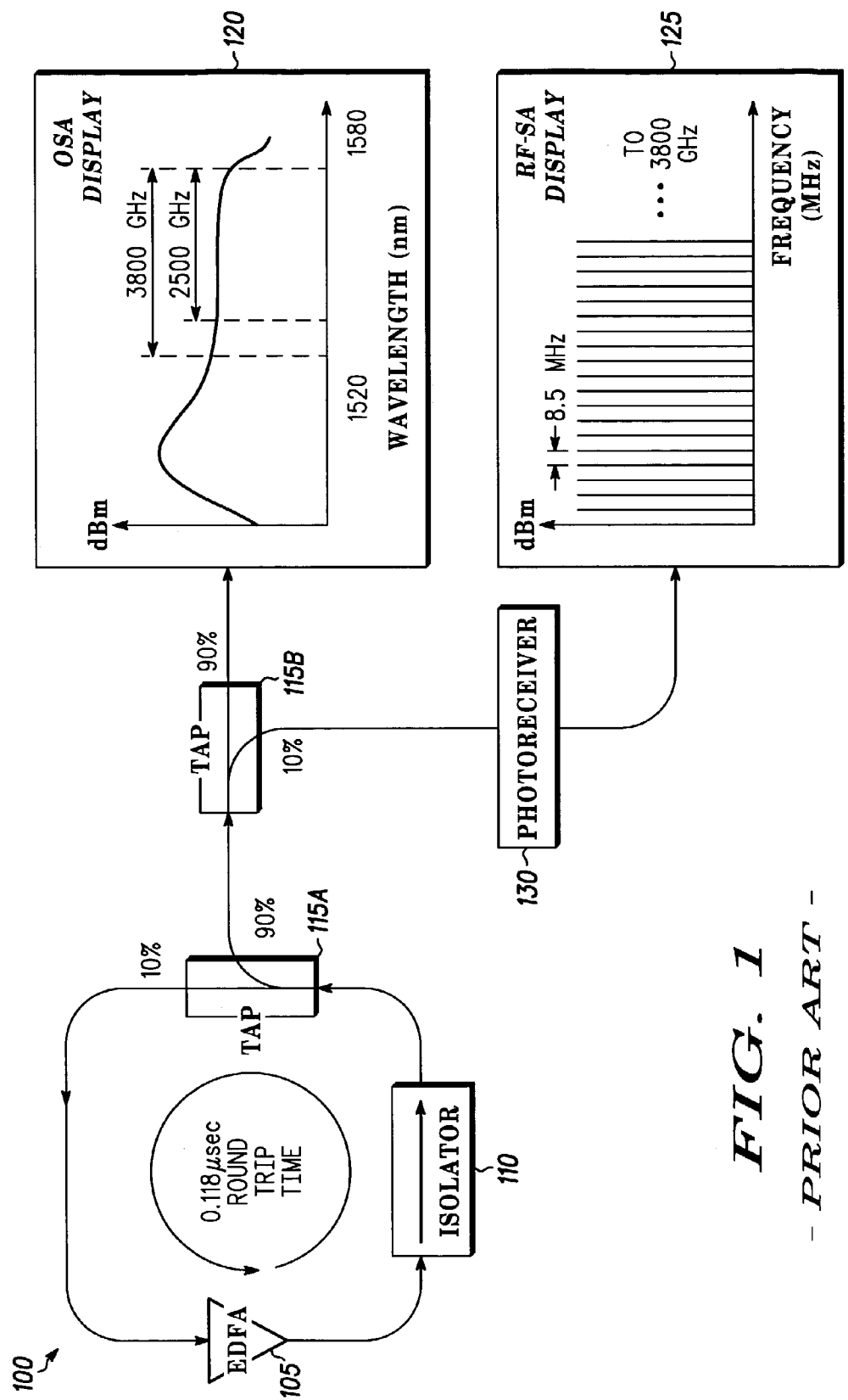
FIG. 1 is a schematic diagram of a conventional unfiltered tunable laser configuration.
Figure 2:
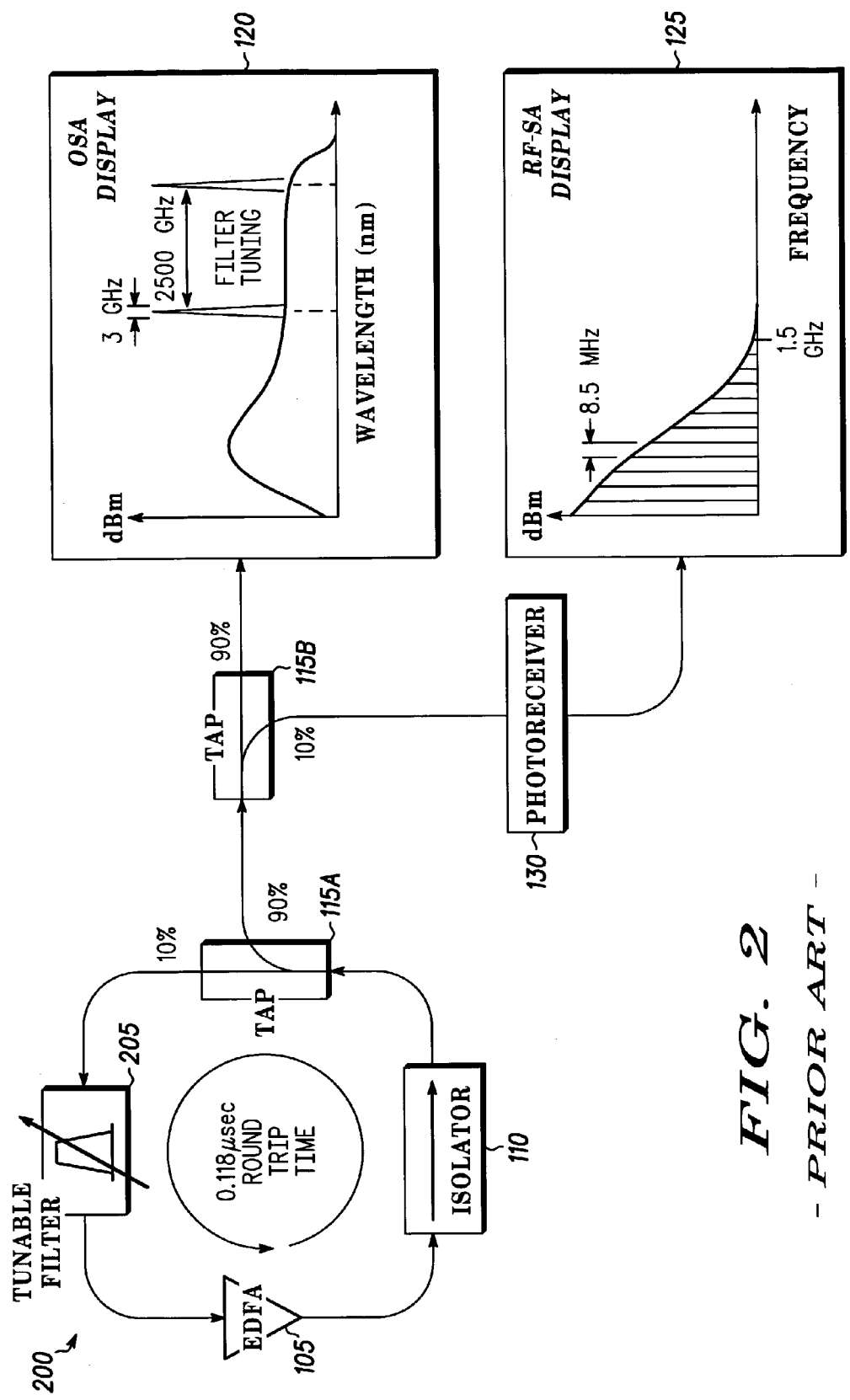
FIG. 2 is a schematic diagram of a conventional filtered tunable laser configuration.

An optical spread spectrum communication system has at its foundation a tunable laser source controlled by a frequency synthesizer for fine tuning and a phase locked loop (PLL) control circuit for coarse tuning. For coarse tuning, the PLL control circuit enables large hops over many hundreds of GHz. This may be used to hop the communication system through the channels of the International Telecommunications Union (ITU) channel grid. The hopping rate is limited by the dynamics of the mechanism used to tune the wavelength of the laser. This can be slow for external tuning mechanisms such as piezo-electric tunable optical filters or more rapid if the tuning mechanism is an integral part of the gain media. Nevertheless, due to the very large amount of spectrum being covered during a single hop, the rate can easily exceed 100,000 GHz/sec even for the slowest tuning devices. For fine tuning, an optical modulator is used to control the particular longitudinal mode that is excited at any given moment during a frequency hopping sequence. The longitudinal mode hopping is a rapid hopping sequence and is limited by the time it takes the RF synthesizer to tune to new frequencies. The upper mode hopping increment is determined by the maximum modulation rate of the modulator (typically 10 or 40 GHz) and thus it is much more confined in spectral breadth (i.e., a single ITU grid channel) as compared to the hopping of the coarse tuning mechanism.

The great utility of this invention comes about as a result of the inclusion of digital RF frequency synthesizer/PLL circuits. The frequency divider value, N, used to compare the reference frequency to the output frequency is not a fixed value and may be set to any value within a given range $N_{min} < N < N_{max}$. This frequency divider ratio is digitally programmable and may be changed rapidly with a microprocessor control unit as dictated by, for example, a frequency hopping algorithm. The hopping sequences are based on the frequency hopping codes for both the coarse (intra-channel) and fine mode hopping (inter-channel) jumps, and are completely controllable by software and/or firmware running on at least one processor. Unlike prior art optical spread spectrum systems, the present invention removes the necessity to assign frequency hopping codes to individual users, and therefore allows for dynamic frequency hopping codes to be randomly assigned, as desired. This imparts security attributes upon an optical spread spectrum communication system implemented in this manner. If the frequency hopping codes are sufficiently complex, it becomes extremely difficult for unauthorized eavesdroppers to decipher the information that is being communicated between users. This is quite desirable for telephony and Internet communications. Because the frequency hopping codes can be assigned as desired, and are not fixed, it quite naturally enables targeted service applications such as video-on-demand and other pay-per-view services. If a particular targeted service event is spread (frequency hopped) utilizing a unique secure code, then only those subscribers who are authorized to receive the targeted broadcast are allowed access to the code and therefore have the ability to decipher and recover the information being sent out. All other users are not able to receive the transmission in an intelligible form.

Figure 3:
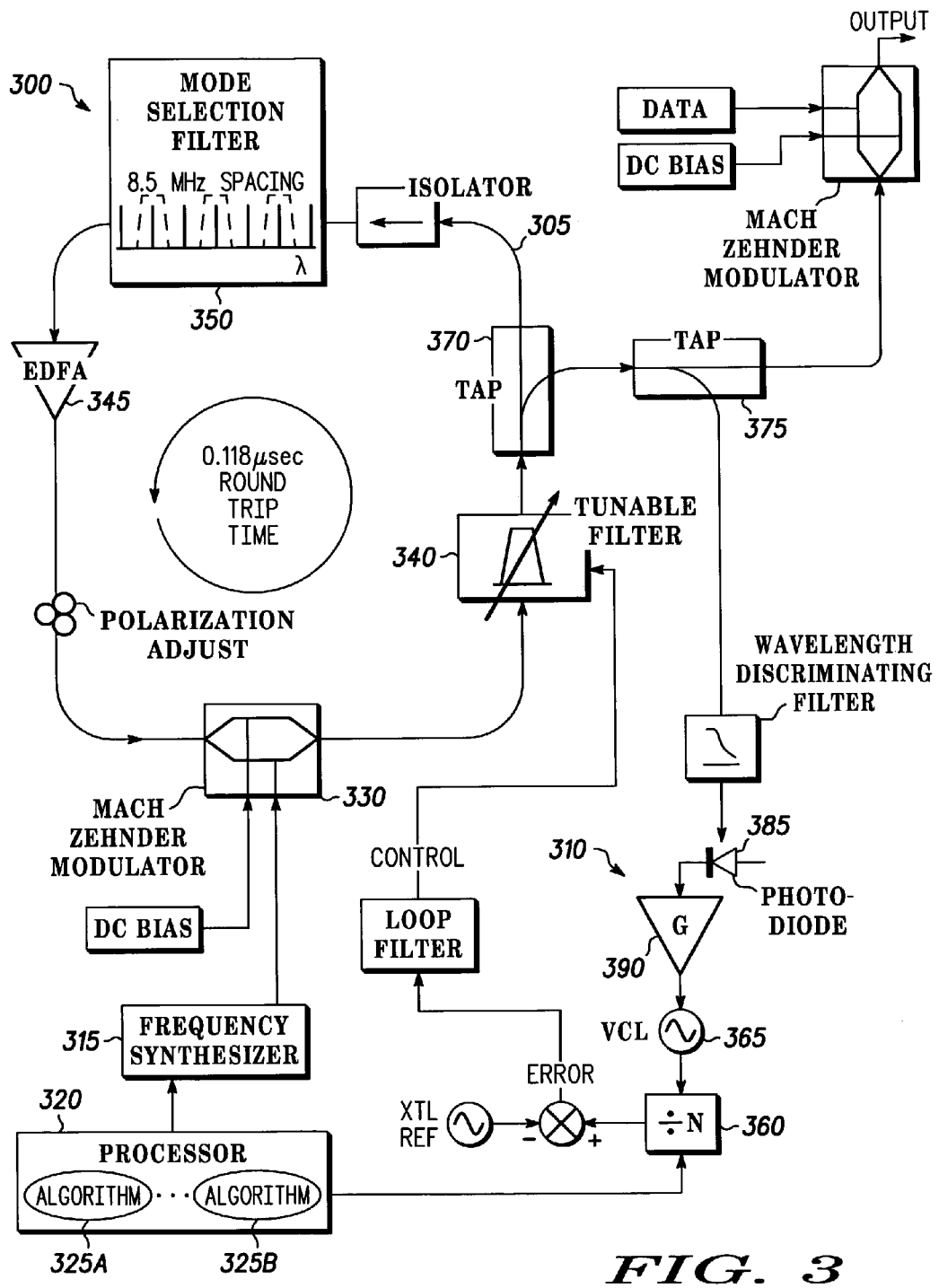
FIG. 3 is an optical spread spectrum communication system in accordance with one preferred embodiment of the present invention.

FIG. 3 shows an optical spread spectrum communication system 300 including a tunable laser 305 (e.g., an erbium doped fiber ring laser (EDFRL)) controlled by two independent frequency hopping control mechanisms in accordance with one preferred embodiment of the present invention. The tunable laser 305 sequentially outputs optical signals having different wavelengths. The tunable laser 305 produces a frequency spectrum having a plurality of closely spaced modes relative to optical frequencies.

The closely spaced modes are actually a continuum of equally spaced optical carriers produced by the laser source. The modes can extend in frequency from the low frequency (long wavelength) limit of the particular laser's gain spectrum, through to the high frequency (short wavelength) limit of this gain spectrum. The coarse hopping tunable channel filter, which has a passband spectrum that is much narrower in extent than the laser's gain spectrum, yet much wider in extent than the mode spacing, selects a particular subset of these modes when tuned to a specific optical channel. The gain media can only amplify the modes that lie within the passband of the tunable filter, hence lasing action can only occur within this subset of modes. The laser modes that fall outside of the tunable filter's passband are immediately extinguished. The narrow hopping modulator, which is controlled by the RF frequency synthesizer, further restricts the subset of allowed modes by selecting only those modes, which are spaced in frequency exactly by the modulation frequency being applied to the modulator at any given instant of time. Hence, optical frequency hopping within the tunable filter's passband may take place, thereby allowing multiple users to share the same optical channel bandwidth simultaneously.

A frequency hopping radio frequency (RF) synthesizer 315 serves as a fine tuning mechanism for controlling an optical modulator 330 (e.g., an optical Mach-Zehnder modulator). The optical modulator 330 is in communication with the tunable laser 305 and is used to select specific modes from the frequency spectrum. The optical modulator 330 is placed in the main ring of the tunable laser 305 to facilitate the fine hopping between the permissible optical frequencies which have been determined by a mode selection filter 350. The optical modulator 330 is used in conjunction with the RF synthesizer 315 to suppress all but the desired mode during the dwell time between frequency hops. The optical modulator 330 acts as an optical gate suppressing all the modes except the current modulation frequency. The maximum hopping rate is determined by the speed at which the RF synthesizer can change frequencies and the maximum hopping frequency is determined by the maximum modulation rate of the modulator (typically 10 or 40 GHz) or the maximum frequency that the RF synthesizer can generate, whichever is lower. If the optical modulator 330 does not sufficiently suppress the unwanted modes while dwelling on a particular frequency, the system 300 may need to be setup such that there is a level detection scheme whereby signals below some given power level are ignored.

The RF synthesizer 315 is used to drive the optical modulator 330. A frequency hopping algorithm controls the RF synthesizer 315. The frequency hopping algorithm is designed to minimize the probability that more than one signal is found on any given grid frequency at any given time. The algorithm, therefore, minimizes the bit (or symbol) error probability (rate).

The mode selection filter 350 enables fine optical frequency hopping by providing a free spectral range (FSR) equal to the minimum frequency jump size, typically ranging anywhere from tens of MHz to tens of GHz.

A phase locked loop (PLL) control circuit 310 serves as a coarse tuning mechanism for controlling a tunable filter 340. The tunable filter 340 is in communication with the optical modulator 330. The tunable filter 340 receives the specific modes and selects specific channels over which the specific modes are to be outputted as the optical signals. The selection of the specific modes by the optical modulator 330 is performed independent of the selection of channels by the tunable filter 340.

Both the PLL control circuit 310 and the frequency hopping RF synthesizer are controlled by a processor 320 that has at least one algorithm 325A, 325B running thereon. Each algorithm 325A, 325B randomly assigns codes used to control the selection of the specific modes within specific channels.

The coarse or large jumping control loop utilizes the technology of the optical frequency synthesizer (on the right) which enables jumps over hundreds of GHz by controlling the piezo-electric fiber Fabry-Perot tunable filter. The large jumps can be set to occur on the ITU grid channels. Fine jumps, contained within the band of a single ITU grid channel, are made possible with a second frequency hopping RF synthesizer that is used in conjunction with a Mach-Zehnder modulator to mode hop the laser, in a controlled way, through the allowed modes of the ring laser. The present invention uses practical means to design and implement a frequency (wavelength) hopping multi-access optical spread spectrum communication system. The present invention recognizes the potential of optical frequency synthesizer technology to control and hop (arbitrarily tune) the output signal wavelength of a tunable laser 305 in when governed by an appropriate frequency hopping algorithm. Furthermore, the present invention also includes components that enable a well-controlled fine optical frequency hopping step also governable by a frequency hopping algorithm. This allows for the development of a frequency hopping optical spread spectrum communication system with large frequency jumps and/or very well controlled fine frequency jumps. The present invention provides flexibility in selecting the jump size and the ability to control the optical frequency hopping sequences by means of adaptable algorithms.

A mode selection filter 350 determines the allowed modes. The mode interval spacing (filter free spectral range (FSR)) may range from a few MHz to a few GHz in accordance with the design of mode selection filter 350. Algorithms running on processor 320 are implemented to enhance the security and capacity of the optical spread spectrum communication system control for both the coarse and fine frequency tuning mechanisms.

The PLL control circuit 310 includes a programmable frequency divider 360 with a ratio N that is continually updated and changed in accordance to at least one frequency hopping algorithm 325A, 325B running on processor 320. Each time the ratio N of programmable frequency divider 360 is updated, a voltage controlled oscillator (VCO) 365 is tuned to a new frequency causing the tunable laser 305 to output a signal with a new wavelength. The VCO 365 is single valued and there is a one-to-one correspondence between the control voltage applied to the VCO 365 and its output frequency. The control voltage outputted by the VCO 365 may be compared to the wavelength of the tunable laser 305 by providing a frequency discrimination mechanism that translates the wavelength of the laser into a voltage again with a one-to-one correspondence. The control voltage is then used to control the frequency of VCO 365. Thus, there is a direct one-to-one relationship between the output frequency of the VCO 365 and the output wavelength (optical frequency) of the tunable laser 305. If the ratio N of programmable frequency divider 360 is changed so as to hop the VCO 365 onto another frequency, the tunable laser 305 must also hop to the corresponding wavelength.

A portion of the output of the tunable laser 305 is tapped off via directional couplers 370, 375 to close the feedback loop by converting the optical signal back to an electrical quantity whose value corresponds in a one-to-one fashion to the wavelength being emitted by the tunable laser 305. An optical receiver circuit consisting of a photodiode 385 and an amplifier 390 accomplishes the optical-to-electrical conversion process. Before the optical-to-electrical conversion takes place, the one-to-one correspondence between the value of the detected electrical signal value and the wavelength of the output of the tunable laser 305 is established. The output power of the tunable laser 305 may change in direct correspondence to the wavelength being emitted. If the output power of the tunable laser 305 remains constant as the device is tuned, then an optical filter 340 with a monotonic single valued transmission response in the optical band of interest is placed in the path between the tapped optical signal and the photo receiver in order to establish the wavelength versus voltage relationship. If the output power of the tunable laser 305 does not remain constant as it is tuned, then a second photodiode (not shown) may be placed at the control input to the optical filter 340, such that a power ratio may be derived. The optical filter 340 may be a fiber Bragg grating type filter, a Fabry-Perot filter, or a dielectric layered filter deposited directly on the active region of photodiode 385. Alternatively, liquid crystal optical filters can be used as frequency discrimination devices with very sharp slopes as compared to the fiber Bragg grating approach.

In one preferred embodiment, the optical spread spectrum communication system 300 includes a tunable laser 305 which sequentially outputs optical signals having different wavelengths. The tunable laser 305 produces a frequency spectrum having a plurality of closely spaced modes relative to optical frequencies. The optical spread spectrum communication system 300 further includes an optical modulator 330 in communication with the laser, and an RF synthesizer 315 in communication with the optical modulator 330. The RF synthesizer 315 controls the optical modulator 330 to allow specific modes from the frequency spectrum to pass through based on randomly assigned codes generated in accordance with one or more algorithms 325A, 325B running on at least one processor 320. The tunable laser 305 may be an erbium doped fiber ring laser (EDFRL). The optical modulator 330 may be an optical Mach-Zehnder modulator.

In another preferred embodiment, the optical spread spectrum communication system 300 includes a tunable filter 340 in communication with the tunable laser 305, and a phase locked loop (PLL) control circuit 310 in communication with the tunable laser 305. The PLL control circuit 310 controls the filter 340 to select specific channels based on randomly assigned codes generated in accordance with one or more of the algorithms 325A, 325B running on processor 320. The tunable laser 305 may be an erbium doped fiber ring laser (EDFRL), a semiconductor optical amplifier ring laser (SOARL), or an external fiber cavity semiconductor laser (EFCSL). The tunable filter 340 may be a fiber Fabry-Perot piezo-electric tunable filter.

In another preferred embodiment, the optical spread spectrum communication system 300 includes tunable laser 305, optical modulator 330, and tunable filter 340. The tunable filter 340 receives specific modes from optical modulator 330 and selects specific channels over which the specific modes are to be outputted as the optical signals. The selection of the specific modes by the optical modulator 330 is performed independent of the selection of channels by the tunable filter 340.

Figure 4:
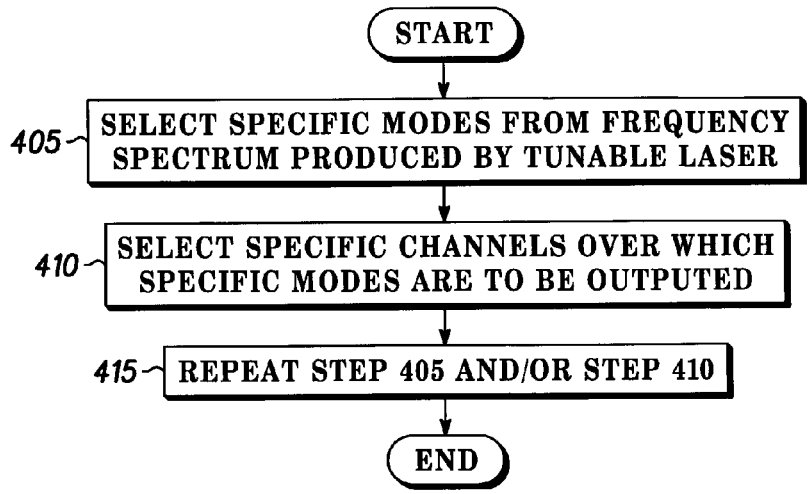
FIG. 4 is a flow chart including method steps used to implement the system of FIG. 3.

FIG. 4 is a flow chart that shows the method steps implemented to practice the basic principles of the optical spread spectrum communication system 300. In step 405, specific modes are selected from the frequency spectrum produced by the tunable laser 305. In step 410, specific channels are selected over which the specific modes are to be outputted as the optical signals. The selection of specific channels is performed independent of the selection of specific modes. In step 415, at least one of step 405 and step 410 is repeated during operation of the system. The wavelengths of the optical signals may be based on a plurality of randomly assigned codes generated in accordance with one or more algorithms. The specific channels may be selected from an International Telecommunications Union (ITU) channel grid.

In a frequency hopping system, the signal bandwidth ($B_s$) is given by:

$$B_s = f_{max} - f_{min} \quad (6)$$

where $f_{max}$ and $f_{min}$ are the highest and lowest frequencies that the frequency hopping communication system can obtain. For a multimode tunable laser source this is equivalent to:

$$B_s = M_{max} \cdot FSR \quad (7)$$

where $M_{max}$ is the total number of modes that exist between the short and long wave length extremes of the tuning range of the laser and FSR is the free spectral range of the laser (i.e., the mode spacing). The FSR is determined by the ring (or cavity) dimensions, the speed of light in the laser structure, and also, when appropriate, any mode selection filters that might be present in the ring. If $f_m$ are the allowed mode frequencies of the fiber laser based solely upon its physical layout (i.e., no mode selection filters) then $f_m$ is given by:

$$f_m = M \cdot \frac{c}{n} \cdot \frac{1}{L} \quad (8)$$

where M is the modal index number, an integer (M=0, 1, 2, . . . , $M_{max}$) and L is the effective circumference of the ring which includes the actual physical length of the fiber ring plus any additional effective lengths due to the various components inserted into the ring which cause additional delays. The speed of light in vacuum is given by c and n is effective the index of refraction in the fiber from which the ring is constructed. The mode spacing (i.e., the FSR) is therefore given by:

$$\frac{\partial f_m}{\partial M} = \frac{c}{n} \cdot \frac{1}{L} = f_1 = FSR \quad (9)$$

The modes are equally spaced and are all harmonics of the fundamental frequency $f_1$. The fundamental frequency is also the FSR of the laser when there is not a mode selection filter present in the ring. Accounting for the M=0 term the total number of modes which can exist is $1+M_{max}$. Plugging Equations (9) and (5) into Equation (7) gives as expected:

$$B_s = \left(\frac{c}{\lambda_{MIN}} - \frac{c}{\lambda_{MAX}}\right) + f_1 \quad (10)$$

where, for completeness, an additional $f_1$ was included into the result in order to account for the M=0 term. In reality, this addendum is quite inconsequential.

The processing gain (PG), which is the measure of the increase in occupied bandwidth of the spread signal relative to its original spectral occupancy, can be calculated as follows: First suppose there are k frequency hops for every message bit. Then if the message bits are of duration $t_m$ the chip rate $f_c$ (frequency hopping rate) is given by $$f_c = \frac{k}{t_m} \quad (11)$$

The original message signal bandwidth ($B_m$) is given by:

$$B_m = \frac{1}{t_m} \quad (12)$$

Given that the minimum hop size is $f_1$ (i.e., the FSR of a multimode laser) then let the ratio of the minimum hop size (or FSR) to the chip rate be given by $\eta$:

$$\eta = \frac{f_1}{f_c} = f_1 \cdot \frac{t_m}{k} \quad (13)$$

Then the processing gain is given by:

$$PG = \frac{B_s}{B_m} = \frac{(M_{max}+1) \cdot f_1}{1/t_m} \quad (14)$$

Using Equation (13) to substitute for $f_1$ gives:

$$PG = \frac{B_s}{B_m} = (M_{max}+1) \cdot k \cdot \eta \quad (15)$$

For an optical frequency hopping system the processing gain depends on the number of frequencies (wavelengths) available, the number of hops per message bit (k), and the ratio of the minimum hop size (FSR) to the hopping rate (chip rate) ($\eta$).

For the exemplary optical spread spectrum communication system 300, the FSR (=$f_1$) is 8.17 MHz. The tuning mechanism is a piezo-electric adjustable fiber Fabry-Perot filter with a maximum tuning rate of about 40 Hz ($f_c$) Assuming that the data rate is OC-3 ($t_m$=1/155.52 MHz=6.43 ns), in the band from 1535 nm through 1565 nm (the tuning range of the filter) there are then 458563 modes ($M_{max}$+1). Then:

$$k = f_c \cdot t_m = 40 \cdot 6.43 \cdot 10^{-9} = 257.2 \cdot 10^{-9}$$

And $$\eta = \frac{f_1}{f_c} = \frac{8.17 \cdot 10^6}{40} = 2.0425 \cdot 10^5$$

Hence the processing gain is:

$$PG = \frac{B_s}{B_m} = (M_{max} + 1) \cdot k \cdot \eta$$

$$= 458563 \cdot 257.2 \cdot 10^{-9} \cdot 2.0425 \cdot 10^5$$

$$= 2.409 \cdot 10^4 \Rightarrow 43.82 \text{ dB}$$

In the above example, the modes are spaced 8.17 MHz apart and the laser operates within a tuning range from 1535 nm through 1565 nm. The unfiltered laser will produce a continuum of modes spaced exactly 8.17 MHz apart running from 1535 nm (195.30 THz) through 1565 nm (191.56 THz), which means there are about 458000 possible modes. A tunable channel filter that is 3 GHz wide will limit the available number of modes to no more than 367, while one that is 50 GHz wide will limit the number of available modes to no more than 6120. The band of specific modes, which may exist at any instant of time, will be centered wherever the tunable filter's center wavelength is set to at that instant of time, and extends across the tunable filter's passband. In this example the narrow hopping modulator will then hop the laser's output frequency to any of these modes. Hence, the RF synthesizer must apply a signal to the modulator at integer multiples of 8.17 MHz (1, 2 . . . N), where 8.17*N is equal to the channel filter's bandwidth (N=367 for the 3 GHz channel filter, N=6120 for the 50 GHz channel filter). The integers are chosen in accordance with the frequency-hopping algorithm.

Equally important for a frequency hopping system is the message bit error probability. This can be approximated by the following expression for an uncoded message (i.e., no error correcting codes employed):

$$P_e \approx \sum_{n=0}^{2} \frac{\binom{2}{n} \cdot \binom{M_{max} - 1}{N - n}}{\binom{M_{max} + 1}{N}} \cdot S_n \quad (16)$$

where $P_e$ is the bit error probability, $(M_{max}+1)$ is the total number of modes (frequencies) available for the system to hop onto, N is the number of potential interfering signals on the system (typically 1 less than the total number of users) which can interfere with the signal of interest, also $N < M_{max} + 1$, and the $S_n$ are defined as follows:

$$S_0 = \frac{\exp(-P_R/2 \cdot N_R)}{2} \quad (17)$$

$$S_1 = S_2 = \frac{1}{2}$$

where $P_R$ is the received power of the desired signal and $N_R$ is the receiver noise power. $S_0$ is essentially the message bit error probability in the absence of interfering signals. Additionally the notations in the parenthesis of Equation (16) are the binomial coefficients (combinations) defined as follows:

$$\binom{m}{k} = \frac{m!}{(m-k)! \cdot k!} \quad (18)$$

As an example, for the system under consideration with 458563 channels and, say, 1001 users (1,000 potential interfering signals), if the un-interfered bit error probability of an message without error correction coding is $10^{-9}$, then in the frequency hopping system the bit error probability is given by:

$$P_e \approx \sum_{n=0}^{2} \frac{\binom{2}{n} \cdot \binom{M_{max} - 1}{N - n}}{\binom{M_{max} + 1}{N}} \cdot S_n = \frac{\binom{2}{0} \cdot \binom{458561}{1000}}{\binom{458563}{1000}} \cdot 10^{-9} +$$

$$\frac{\binom{2}{1} \cdot \binom{458561}{999}}{\binom{458563}{1000}} \cdot \frac{1}{2} + \frac{\binom{2}{2} \cdot \binom{458561}{998}}{\binom{458563}{1000}} \cdot \frac{1}{2}$$

$$= 10^{-9} \cdot 0.99564 + 2.176 \cdot 10^{-3} + 0.5 \cdot 4.7508 \cdot 10^{-6}$$

$$= 2.1784 \cdot 10^{-3}$$

This result is approximately equal to 1001/458563, the ratio of the number of users to the number of available channels in the frequency hopping system. This result is also essentially independent of the transmitting power levels of the user. The employment of forward error correcting codes such as Reed-Solomon substantially improves these bit error probability results.

Figure 5:
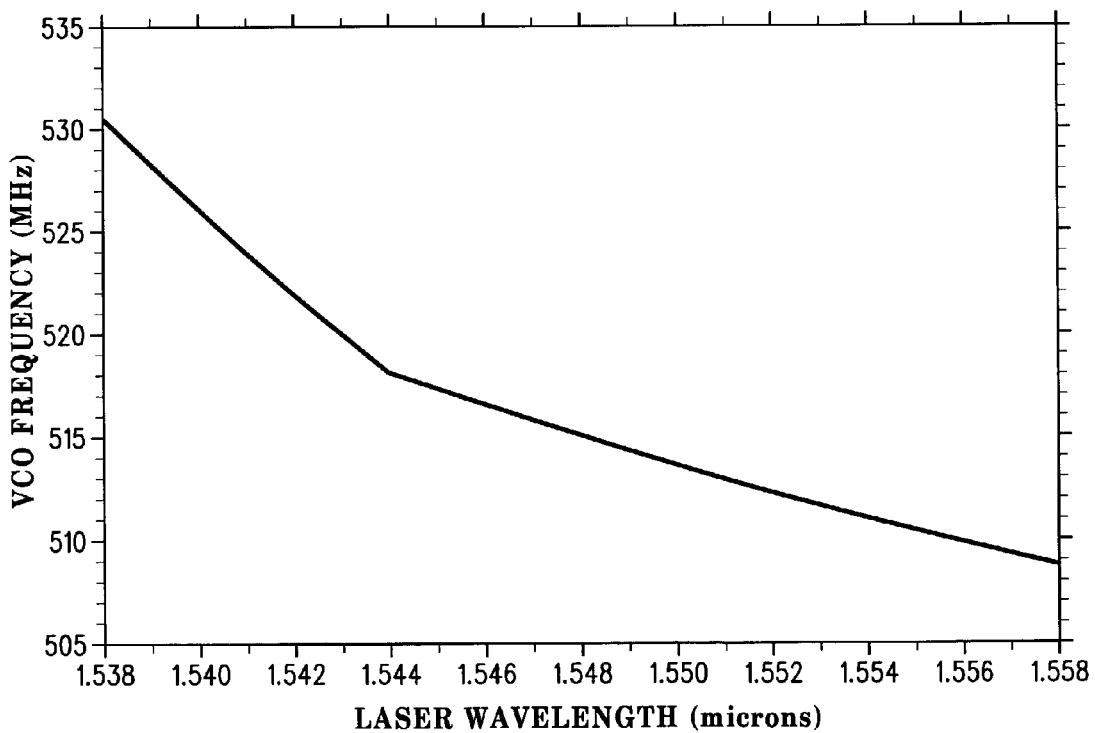
FIG. 5 is a graph of the output wavelength of a tunable laser versus the frequency output of a voltage controlled oscillator used to control the tunable laser in accordance with one preferred embodiment of the present invention.

FIG. 5 shows a one-to-one correspondence between the output wavelength of the tunable laser 305 and the frequency of the VCO 365 in the PLL control circuit 310.

Figure 6:
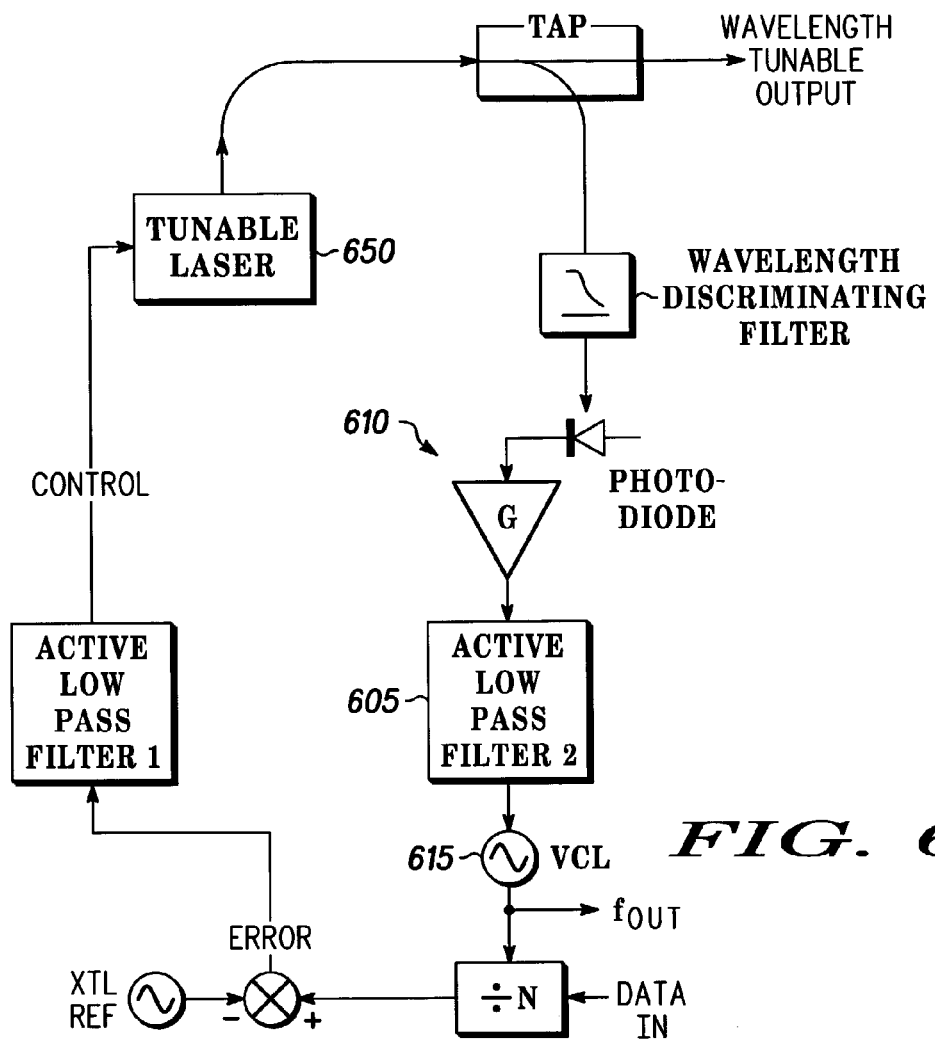
FIG. 6 is a schematic of a PLL control circuit using a second active lowpass filter to implement coarse tuning of a tunable laser in accordance with an alternate embodiment of the present invention.

FIG. 6 shows an alternate embodiment of the PLL control circuit with a second active lowpass filter 605 connected to the electrical output of the photoreceiver circuit 610 in order to condition the signal so that it can control the frequency of VCO 615 with minimal noise. The output of this second active lowpass filter 605 is connected to the control terminals of the VCO 615 to close the feedback loop and hop both the RF frequency of VCO 615 and the wavelength of tunable laser 650 simultaneously. Changing the frequency divider ratio, N, in accordance with a frequency hopping algorithm, forces the error signal to be nonzero causing the wavelength of the laser to hop which in-turn initiates the hopping of the VCO frequency until the error is once again restored to zero at the new optical wavelength and RF frequency. When the next hopping command is given by changing the frequency divider ratio, the process repeats itself.

In order to realize the functionality of the optical frequency hopping system, the control voltage at the output of the active lowpass filter is rerouted to the wavelength tuning mechanism of the tunable laser, as compared to a standard RF PLL circuit. The lowpass filter, itself, may have to be modified in order to ensure that its output signal is compatible with the wavelength tuning mechanism of the laser source. For example the bandwidth may have to be altered, the transmission response roll off might need to be modified, the signal level may have to be adjusted, and the polarity might need to be reversed. The control voltage (loop error signal) is now controlling the wavelength of the tunable laser rather than the frequency of the VCO directly. Thus, in order to tune the VCO, in accordance with the settings of the adjustable frequency divider, the wavelength of the laser must first tune to the new wavelength. In this way, the coarse frequency (wavelength) hopping functionality is achieved.

The fine optical frequency hopping intervals can range from just a few MHz to several tens of GHz. The minimum interval size and consequently the allowed optical modes are determined by the FSR of the EDFRL in combination with a mode selection filter that may be inserted into the ring laser configuration. In practice, the mode selection filter exhibits very strong finesse enhanced resonance peaks because the gain of the EDFA completely compensates for any losses in the passive mode filter. The passbands have been observed with full-width-half-max (FWHM) bandwidths of only 400 KHz (in the optical frequency domain). Hence, the modes of the tunable laser are pulled onto the resonance peaks of the mode filter in a process that mimics the frequency pulling effects of a high Q piezo-electric crystal when it is placed in a resonant circuit of an electronic oscillator. The mode filters can be realized utilizing a variety of different technologies including, micro-electro-mechanical devices (MEMS), micro-optic devices, monolithic optical filters, liquid crystal devices, thin film devices, AWG filters, etc.

Figure 7:
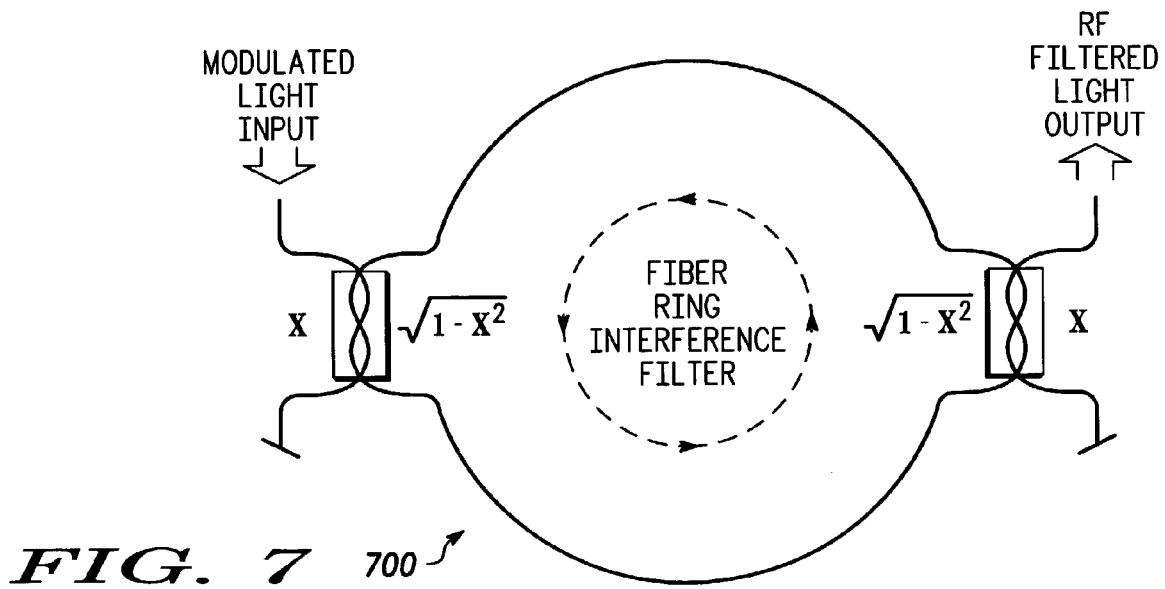
FIG. 7 is a schematic of a double coupler fiber ring mode filter in accordance with one embodiment of the present invention.

FIG. 7 shows a double coupler fiber based ring filter 700 utilizing polarization maintaining (PM) components and PM fiber interconnects. This device is spliced together with the aid of a polarization maintaining fusion splicer. The circumference of the ring filter is tailored to achieve an FSR that corresponds to reasonable frequency hopping intervals within the RF or microwave range. The FWHM passbands of the filter are determined by the coupling ratios of the two couplers, the losses in the filters, and the gain of the EDFA which compensates for the filter losses. Essentially, the EDFA in combination with the ring filter constitutes a very high finesse (Q) active optical filter with very narrow passbands (relative to the optical signal frequencies) and FSRs in the RF to microwave frequency range. All of the components, including the interconnecting fiber of the ring, are polarization maintaining.

The FSR of the mode filter is given by:

$$FSR = \frac{c}{n} \cdot \frac{1}{C} \quad (19)$$

where c is the velocity of light in vacuum, n is the effective index of refraction of the fiber at the wavelength of interest (n~1.4682 at 1550 nm), and C is the total circumference of the ring including the lengths of the two couplers.

The coefficient of finesse ($F_C$) for the mode filter (excluding losses) in FIG. 6 is given by:

$$F_C = \frac{4 \cdot (1 - x^2)}{(1 - (1 - x^2))^2} = \frac{4 \cdot (1 - x^2)}{x^4} \quad (20)$$

The passive bandwidth of each passband of the fiber ring mode filter (excluding the loss compensation effects of the EDFA, i.e., no finesse enhancement) is given by:

$$BW = \frac{2}{\pi} \cdot \frac{1}{\sqrt{F_C}} \cdot FSR \quad (21)$$

The passive finesse is by definition:

$$\text{Finesse} = \frac{FSR}{BW} = \frac{\pi}{2} \cdot \sqrt{F_C} \quad (22)$$

The gain enhancement effects of the EDFA can reduce the bandwidths quite substantially. In the laboratory the bandwidths were reduced by factors of nearly 40. Thus, from 22, the finesse is enhanced by a factor of 40. The EDFA does not affect the FSR of these filters.

Figure 8:
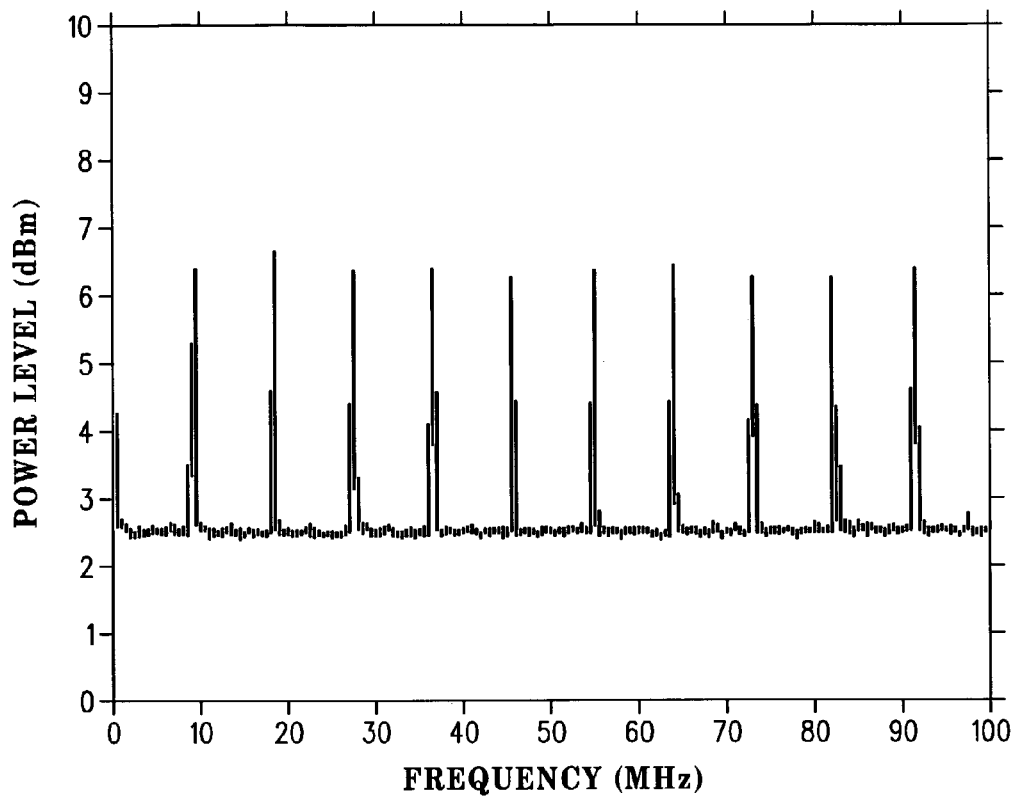
FIG. 8 shows the natural modes of an EDFRL configuration without a fiber ring mode filter in place in accordance with one embodiment of the present invention.

FIG. 8 shows the natural modes of a fiber ring laser without a fiber ring mode filter in the feedback loop. The FSR of these modes is 9 MHz. From Equation (4), the effective length of the EDFRL is about 22.688 m.

Figure 9:
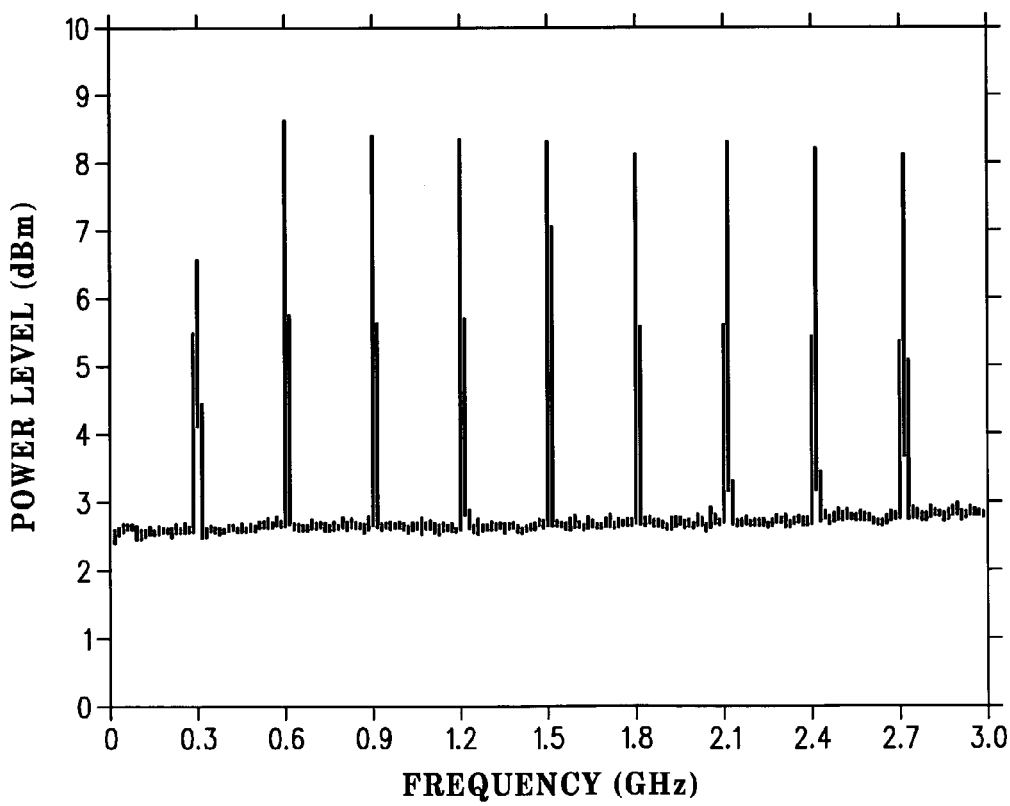
FIG. 9 shows the modes of an EDFRL configuration with a 300 MHz fiber ring mode filter inserted in the main ring of the EDFRL with 400 KHz wide passbands in accordance with one embodiment of the present invention.

FIG. 9 shows the effect of inserting the double coupler fiber based ring filter 700 having a circumference is 0.681 m and an FSR of 300 MHz into the main ring of an EDFRL. The filter. The laser modes are spaced at 300 MHz intervals in accordance with the double coupler fiber based ring filter 700. Due to the gain enhancement effects of the EDFA 345, each passband is only 400 KHz wide. The passive filter bandwidth is 15 MHz. As a result of the gain of the EDFA 345 in the tunable laser 305, the finesse enhancement effect is 37.5. The double coupler fiber based ring filter 700 has passbands with 15 MHz, 3 dB points, effectively making the double coupler fiber based ring filter 700 an ultra high-resolution active optical filter. The bandwidth of each passband depends upon the coupler ratios of double coupler fiber based ring filter 700.

Figure 10:
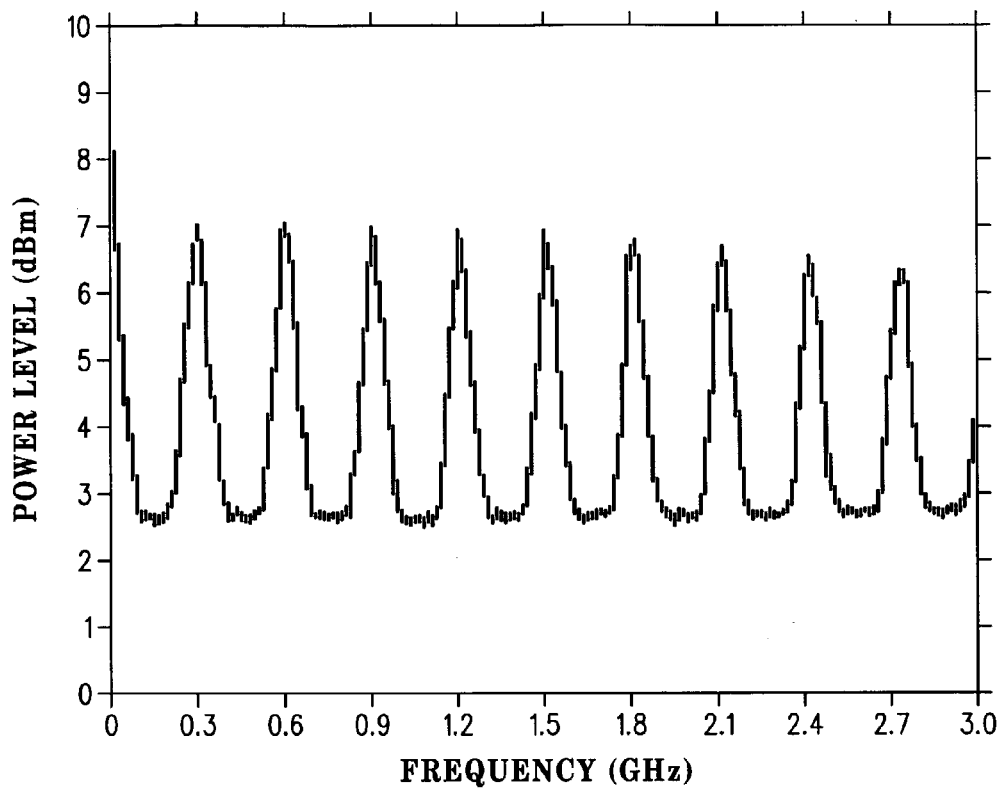
FIG. 10 shows the modes of an EDFRL configuration with a 300 MHz fiber ring mode filter inserted in the main ring of the EDFRL with 4 MHz wide passbands in accordance with one embodiment of the present invention.

FIG. 10 shows laser modes that are spaced 300 MHz apart. In this case, each passband is increased by a factor of 100 (with respect to the example in FIG. 9) to 4 MHz by reducing the coupling ratio of the loop of the tunable laser. Due to the gain enhancement effects of the EDFA 345, each passband is 40 MHz wide. As a result of the gain of the EDFA 345 in the tunable laser 305, the finesse enhancement effect is 10.

Figure 11:
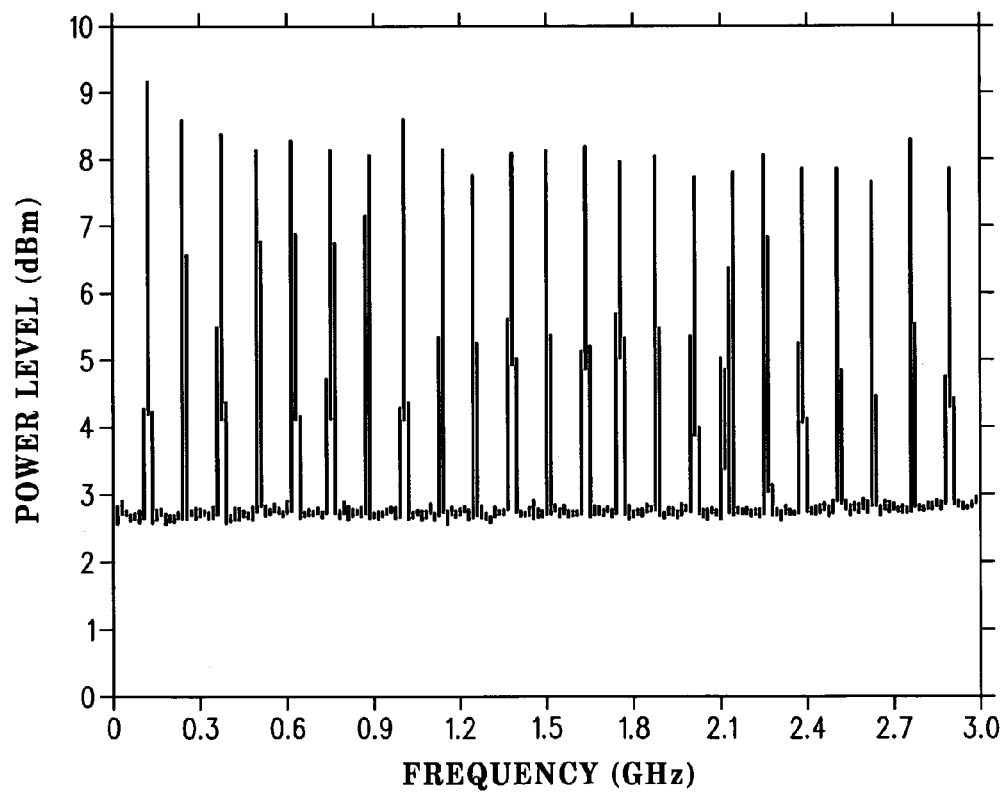
FIG. 11 shows the laser modes with a 125 MHz high finesse fiber ring mode filter inserted in the main ring of an EDFRL in accordance with one embodiment of the present invention.

FIG. 11 shows laser modes with a 125 MHz high finesse fiber ring mode filter inserted into the main ring of the fiber laser. This filter has a ring circumference of 1.634 meters. Each passband, due to the gain enhancement effects of the EDFA, is only 167 KHz wide. The passive filter bandwidth was designed to be 6.25 MHz. The finesse enhancement effect is 37.5.

The modal spacing can be forced onto a grid of very closely spaced allowed frequencies (standardized channels) upon which the communication system can hop to and from. The allowed modes of an erbium doped fiber ring laser can be tailored to suit the needs of a particular fine optical frequency hopping system by pulling them onto a grid of frequencies exclusively determined by the use of an appropriately designed mode filter. Clearly the modes in the above examples are only spaced tens of MHz apart from one another with the absolute optical frequencies being in the vicinity of 193.4 THz ($10^{12}$ Hz). Using the PM fiber ring mode filters, modal spacing accuracies of 1 ppm, or better, relative to the absolute optical frequencies can be achieved.

With the modes closely spaced, on a fixed standardized grid, a fine optical frequency hopping multiple-access system can actually be implemented within the passband of a single ITU grid channel. For example, in a single 50 GHz ITU channel the optical modes may be spaced on a 250 MHz grid, with the use of appropriate mode filters in the communication system. This provides 200 sub-channels upon which the multiple simultaneous users of this one ITU channel can hop through.

All of the disclosed circuitry can be built on a printed circuit board utilizing modern surface mount components. The wavelength control/tuning hopping circuitry is most easily constructed by utilizing standard electronic PLL/frequency synthesizer integrated circuits (ICs) of which there are numerous manufacturers. Essential elements include frequency dividers (single or dual modules), phase/frequency detector, a charge pump or other searching mechanism to bring the EDFRL into the locked state. Additionally, a stable crystal oscillator is utilized as a frequency reference, and a VCO with an appropriate tuning range is needed as well. If the VCO tunes to frequencies higher than the capability of the PLL ICs, an external frequency prescaler (divider) IC is used. IC operational amplifiers are used to provide lowpass filtering and also signal scaling so that control voltage (or current) levels are compatible with the devices being controlled. An operational amplifier is used as an amplifier in a photoreceiver circuit. A semiconductor III-V photodiode with a fiber optic pigtail is used to detect an optical signal and convert it into an electrical signal.

The present invention may be implemented with any combination of hardware and software. If implemented as a computer-implemented apparatus, the present invention is implemented using means for performing all of the steps and functions described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of controlling a laser to sequentially output optical signals having different wavelengths, the laser being in an optical spread spectrum communication system and being a tunable laser which produces a frequency spectrum having a plurality of closely spaced modes relative to optical frequencies, the method comprising:
   (a) selecting specific modes from the frequency spectrum using an optical modulator;
   (b) selecting specific channels over which the specific modes are to be outputted as the optical signals, wherein the selection of specific channels is performed independent of selection of mode spacing;
   randomly assigning codes used to control the selection of specific modes and the specific channels;
   controlling the optical modulator using a frequency synthesizer based on the randomly assigned codes; and
   (c) repeating at least one of step (a) and step (b) during operation of the system.

2. The method of claim 1 wherein the wavelengths of the optical signals are based on the randomly assigned codes generated in accordance with one or more algorithms.

3. An optical spread spectrum communication system, comprising:
   (a) a tunable laser which sequentially outputs optical signals having different wavelengths, the laser producing a frequency spectrum having a plurality of closely spaced modes relative to optical frequencies;
   (b) an optical modulator configured to operate within the tunable laser;
   (c) at least one processor associated with a mode selection filter and a channel selection filter;
   (d) at least one algorithm running on the processor, the algorithm randomly assigning codes used to control the selection of mode spacing by the mode selection filter and the specific channels by the channel selection filter; and
   (e) a frequency synthesizer in communication with the optical modulator, wherein the frequency synthesizer controls the optical modulator to allow specific modes from the frequency spectrum to pass through based on the randomly assigned codes.

4. The system of claim 3 wherein the tunable laser is an erbium doped fiber ring laser (EDFRL).

5. The system of claim 3 wherein the optical modulator is an optical Mach-Zehnder modulator.

6. An optical spread spectrum communication system, comprising:
   (a) a tunable laser which sequentially outputs optical signals having different wavelengths, the laser producing a frequency spectrum having a plurality of closely spaced modes relative to optical frequencies;
   (b) an optical modulator configured to operate within the tunable laser, the optical modulator selecting specific modes from the frequency spectrum;
   (c) a tunable filter in communication with the optical modulator, the filter receiving the specific modes and selecting specific channels over which the specific modes are to be outputted as the optical signals,
   (d) at least one processor;
   (e) at least one algorithm running on the processor, the algorithm randomly assigning codes used to control the selection of the specific modes and the specific channels; and
   (f) a frequency synthesizer in communication with the optical modulator and the processor, the frequency synthesizer controlling the optical modulator based on the randomly assigned codes,
   wherein the selection of the specific modes by the modulator is performed independent of the selection of channels by the tunable filter.

7. The system of claim 6 further comprising:
   (f) a phase locked loop (PLL) control circuit in communication with the tunable filter and the processor, the PLL control circuit controlling the filter based on the randomly assigned codes.

* * * * *

UNITED STATES PATENT AND TRADEMARK OFFICE
CERTIFICATE OF CORRECTION

PATENT NO.         : 7,418,205 B2  
APPLICATION NO.    : 10/397808  
DATED              : August 26, 2008  
INVENTOR(S)        : Litvin It is certified that error appears in the above-identified patent and that said Letters Patent is hereby corrected as shown below:

COLUMN 9:  
Line 32: Please delete "wave length" and insert --wavelength--  
Line 47: Please delete "th e" and insert --the--

COLUMN 10:  
Line 61: Please delete "($f_c$)" and insert --($f_c$).--

Signed and Sealed this

Eighth Day of September, 2009

David J. Kappos  
*Director of the United States Patent and Trademark Office*